(No Model.)

J. H. THURSTON.
FALSE NIPPLE FOR RECEIVERS.

No. 566,881.  Patented Sept. 1, 1896.

Witnesses
Geo. H. Sonneborn
Frederick H. Davis

Inventor
John H. Thurston
by
Attorney

UNITED STATES PATENT OFFICE.

JOHN H. THURSTON, OF BOSTON, MASSACHUSETTS.

FALSE NIPPLE FOR RECEIVERS.

SPECIFICATION forming part of Letters Patent No. 566,881, dated September 1, 1896.

Application filed October 5, 1895. Serial No. 564,821. (No model.)

*To all whom it may concern:*

Be it known that I, JOHN H. THURSTON, of Boston, Massachusetts, have invented a new and useful Improvement in False Nipples for Receivers, of which the following is a description, referring to the accompanying drawings, which form a part of this specification.

My invention forms an article of manufacture which may be used with each magic-lantern or stereopticon outfit as a substitute for the screw-nipple on the oxygen or hydrogen receiver when such screw-nipple has been injured in transportation, as is frequently the case. The device is of so simple a nature that it will be understood from the accompanying drawings, wherein—

Figure 1:
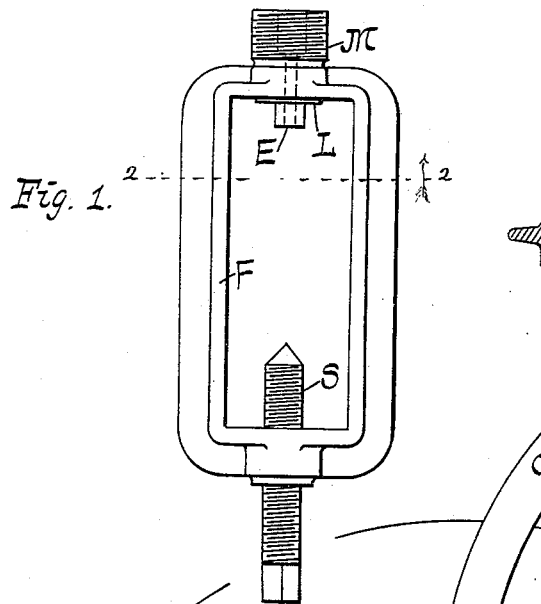
Figure 2:
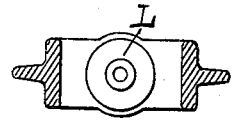

Figure 1 shows the device in full. Fig. 2 shows a cross-section on the lines 2 2, Fig. 1, looking in the direction of the arrow; and Fig. 3 is a view showing my device in use.

At V is shown the valve of an oxygen or other receiver provided with the screw-nipple N, which is threaded to fit the female screw in the lantern-pipe nipple or connection N', to which is secured the pipe O, which conveys the gas to the lantern. It very frequently happens that the screw-threads at N are so injured in transporting the receiver that it is not possible to properly screw the lantern-pipe connection N' onto it. My false-nipple device, however, which may be carried with each lantern outfit, obviates this difficulty and prevents the inconvenience and delay which would otherwise result. This device consists of a screw-nipple M, which is carefully fitted to the threads of the pipe connection N', and as the device can be readily carried in the pocket of the operator or packed with the lantern it is not subject to injury and is therefore always ready for use. This false nipple M is provided with the loop or frame F, which surrounds the receiver-valve V. The screw S, provided with the conical point s, serves to force the nipple N against the leather washer or packing L. This washer surrounds the projection or stud E, which extends into the screw-nipple N of the receiver-tank and facilitates the proper placing of the false nipple.

Figure 3:
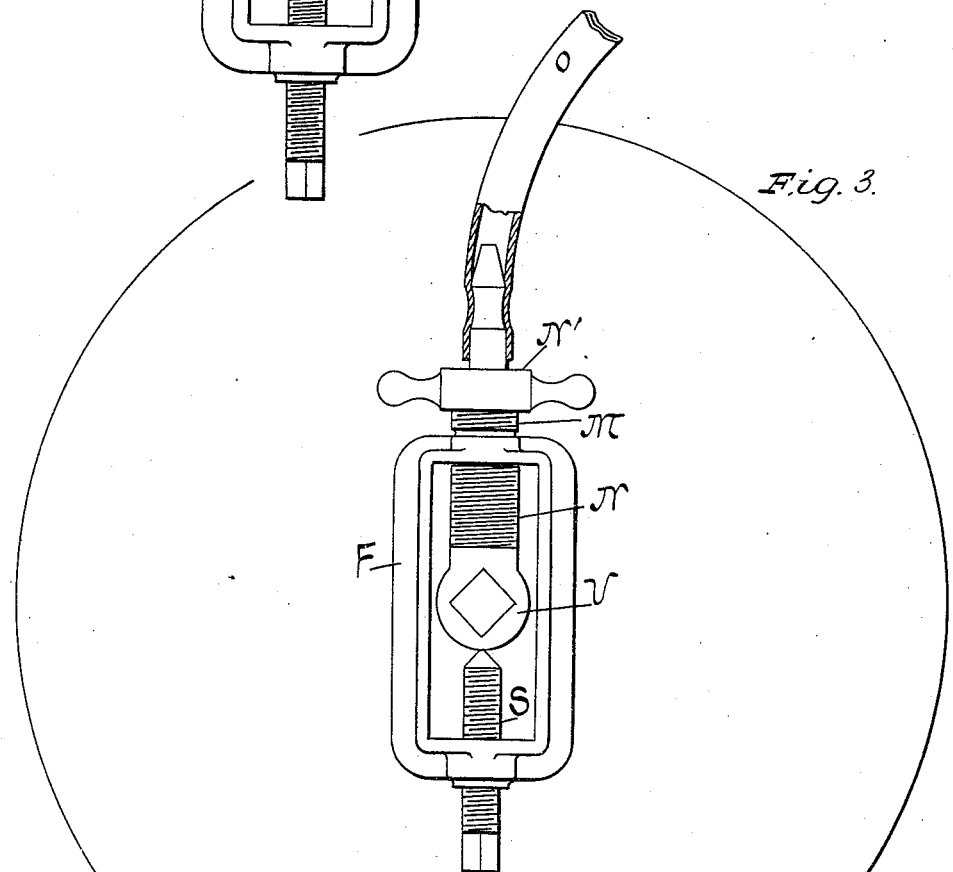

When the nipple has been put in place, as in Fig. 3, and the screw S turned by clamping the false nipple M firmly upon the nipple N, it is clear that the false nipple M virtually replaces the injured nipple N, and the lantern-pipe connection N' may be screwed on in the same way as it would have been screwed onto the nipple N if this nipple had not been injured. The sharp conical point s of the screw S penetrates into the metal of the valve V sufficiently to keep the frame F firmly fixed in place without danger of slipping, and in this way obviates the necessity of having a head or follower on the screw S adapted to accurately fit the back of the valve V.

From an inspection of Fig. 3 it will be seen that so long as the screw-threads of the nipple N fit into the pipe connection N' there is no need of threading on the nipple N, and it therefore becomes immaterial whether or no these threads N fit the lantern-pipe connection N'. Therefore my false nipple may be employed where there is a misfit between the lantern-pipe connection and the receiver-nipple, as well as where the receiver-nipple has been injured.

Such briefly is the description of my false or substitute nipple. Its many analogous uses and advantages will be readily apparent to those skilled in the art, and I will not attempt to enumerate them further.

What I claim, and desire to secure by these Letters Patent of the United States, is as follows:

1. In combination, the lantern or other pipe O, and manual screw connection N' therefor, the valve or outlet V and the nipple N thereof, fitted to the said connection N', and the intermediate connection or nipple M also fitted to the said connection N' and provided with means for securing it to the said nipple N, whereby the connection N' may be secured either directly to the said nipple N or the said intermediate nipple M introduced between, substantially as set forth.

2. In combination with the flexible lantern-pipe or other tube O, the screw connection N' to which the said tube is secured, the nipple M fitted to but detachable from the said connection N', and provided with a frame or yoke F and with means, as a screw S, for securing it to the nipple of a gas-receiver valve or other outlet, substantially as set forth.

In testimony whereof I have hereunto set my hand, at Boston, Massachusetts, this 21st day of September, A. D. 1895.

JOHN H. THURSTON.

In presence of—
 HARRY D. BANTA,
 ARTHUR HASTINGS.